(12) United States Patent
Yang et al.

(10) Patent No.: US 8,085,861 B2
(45) Date of Patent: Dec. 27, 2011

(54) APPARATUS AND METHOD FOR ESTIMATING SIGNAL TO INTERFERENCE AND NOISE RATIO IN A WIRELESS COMMUNICATION SYSTEM

(75) Inventors: Ha-Young Yang, Yongin-si (KR); Jeong-Tae Oh, Yongin-si (KR); Hwa-Sun You, Suwon-si (KR); Jae-Ho Jeon, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 625 days.

(21) Appl. No.: 12/209,830

(22) Filed: Sep. 12, 2008

(65) Prior Publication Data

US 2009/0074047 A1    Mar. 19, 2009

(30) Foreign Application Priority Data

Sep. 13, 2007    (KR) .................................. 2007-92943

(51) Int. Cl.
*H04K 1/10*    (2006.01)
*H04L 27/28*   (2006.01)
(52) U.S. Cl. ....................................... 375/260; 375/259
(58) Field of Classification Search .................... 375/260
See application file for complete search history.

(56) References Cited

U.S. PATENT DOCUMENTS

| | | | | |
|---|---|---|---|---|
| 6,072,433 | A * | 6/2000 | Young et al. | 342/386 |
| 6,847,678 | B2 * | 1/2005 | Berezdivin et al. | 375/146 |
| 7,606,299 | B2 | 10/2009 | Chang et al. | |
| 2001/0002822 | A1 * | 6/2001 | Watters et al. | 342/357.1 |
| 2004/0015348 | A1 * | 1/2004 | McArthur et al. | 704/226 |
| 2004/0219926 | A1 * | 11/2004 | Kim et al. | 455/452.2 |
| 2006/0083160 | A1 | 4/2006 | Koo et al. | |
| 2007/0060180 | A1 * | 3/2007 | Muharemovic et al. | 455/509 |
| 2007/0076589 | A1 * | 4/2007 | Stopler et al. | 370/210 |
| 2007/0218908 | A1 * | 9/2007 | Kang et al. | 455/442 |
| 2008/0014958 | A1 * | 1/2008 | Kim et al. | 455/452.2 |

FOREIGN PATENT DOCUMENTS

| KR | 10-2006-0001734 A | 1/2006 |
|---|---|---|
| KR | 10-2006-0033605 A | 4/2006 |

* cited by examiner

*Primary Examiner* — David Payne
*Assistant Examiner* — Erin File
(74) *Attorney, Agent, or Firm* — Jefferson IP Law, LLP

(57) ABSTRACT

An apparatus and method for estimating a Signal to Interference plus Noise Ratio (SINR) in a wireless communication system are provided. The method includes processing a received signal by Orthogonal Frequency Division Multiplexing (OFDM) demodulation to convert the received signal into frequency-domain data, selecting ranging data from the frequency-domain data, multiplying the selected ranging data by a ranging code to perform code demodulation, calculating at least one norm value and at least one coherent norm value by bundle for the code-demodulated data and estimating an SINR using the calculated at least one norm value and at least one coherent norm value.

25 Claims, 4 Drawing Sheets

APPARATUS AND METHOD FOR ESTIMATING SIGNAL TO INTERFERENCE AND NOISE RATIO IN A WIRELESS COMMUNICATION SYSTEM

PRIORITY

This application claims the benefit under 35 U.S.C. §119(a) of a Korean patent application filed in the Korean Intellectual Property Office on Sep. 13, 2007 and assigned Serial No. 2007-92943, the entire disclosure of which is hereby incorporated by reference.

BACKGROUND OF THE INVENTION

1. Field of the Invention

The present invention relates to an apparatus and method for reception in a wireless communication system. More particularly, the present invention relates to an apparatus and method for estimating a Signal to Interference plus Noise Ratio (SINR) of a ranging signal in a wireless communication system.

2. Description of the Related Art

As known in the art, wireless communication systems were originally developed to provide voice service. As technology has evolved, wireless communication systems now provide data service and a variety of multimedia services in addition to the voice service. However, conventional wireless communication systems, which were developed to provide only voice services, have a narrow bandwidth and require a high service fee, thus failing to satisfy diversified user demands. Further, with the continued development of the wireless communication industry and an increase in user demand for Internet service, a need for a communication system that efficiently provides the Internet service increases. Accordingly, a broadband wireless communication system for efficiently providing an Internet service has been introduced.

The broadband wireless communication system uses Orthogonal Frequency Division Multiplexing/Orthogonal Frequency Division Multiple Access (OFDM/OFDMA). Thus, the broadband wireless communication system can provide high-rate data transmission by transmitting a physical channel signal using a plurality of subcarriers. A wireless access scheme for the broadband wireless communication system has been standardized by the Institute of Electrical and Electronics Engineers (IEEE) 802.16 standardization group, which is an international standardization group.

Ranging, which is a kind of random access process, is defined by the broadband wireless communication system. The ranging process can be classified into initial ranging, periodic ranging, bandwidth request ranging, handover ranging and the like. More particularly, the initial ranging and periodic ranging are used to estimate Signal to Interference and Noise Ratio (SINR) to determine and control signal power, to measure a propagation delay for frame synchronization and to detect a user who intends to access a system. If an error occurs in the SINR estimation, control of signal power may not function properly. Thus, a transmitted/received signal may act as interference to neighboring cells and cause deterioration not only to the ranging process but also to the entire performance of the communication system.

A ranging code (i.e., a code set) used during the ranging process is broadcast using an Uplink Channel Descriptor (UCD) message. A Mobile Station (MS) attempts ranging by transmitting a ranging code suitable to a purpose through a ranging region that is allocated through an uplink resource allocation message (i.e., aUL-MAP). A Base Station (BS) calculates timing and frequency offset and the like using a received ranging code, includes the offset correction value in a ranging response (RNG-RSP) message, and sends the RNG-RSP message to the MS.

As described above, ranging codes are classified corresponding to their purpose. However, when a different MS transmits the same ranging code, code collision may occur because an MS randomly selects one of several ranging codes. When the ranging codes collide, an SINR measured by a BS is reduced due to the code collision.

Also, a plurality of MSs, being in communication with one BS, each performs absolute time synchronization and attempt ranging. However, there is a timing offset in a ranging signal received by the BS depending on a location of the MS. When the timing offset is generated, an SINR measured by the BS is reduced.

Thus, in order to accurately estimate an SINR of a ranging signal, it is required to be robust, that is effectively immune to other codes attempting ranging at the same time. Furthermore, it is required to remove the influence of a timing offset caused by a propagation delay that is generated depending on a location of an MS attempting ranging.

SUMMARY OF THE INVENTION

An aspect of the present invention is to address at least the above-mentioned problems and/or disadvantages and to provide at least the advantages below. Accordingly, one aspect of the present invention is to provide an apparatus and method for estimating a Signal to Interference and Noise Ratio (SINR) of a random access signal in a communication system.

Another aspect of the present invention is to provide an apparatus and method for estimating an SINR of a ranging signal in a communication system.

A further another aspect of the present invention is to provide an apparatus and method for estimating an SINR using a propagation delay of a ranging signal in a communication system.

According to one aspect of the present invention, an apparatus for reception in a wireless communication system is provided. The apparatus includes a demodulator for processing a received signal by Orthogonal Frequency Division Multiplexing (OFDM) demodulation to convert the received signal into frequency-domain data, a selector for selecting ranging data from the frequency-domain data, a multiplier for multiplying the selected ranging data by a ranging code and to perform code demodulation, and an SINR estimator for calculating at least one norm value and at least one coherent norm value by bundle for the code-demodulated data and for estimating an SINR using the calculated at least one norm value and at least one coherent norm value.

In an exemplary implementation, the SINR estimator may include a detector for detecting a timing offset using the code-demodulated data, a phase compensator for phase-compensating the code-demodulated data using the timing offset, a first calculator for calculating at least one norm value per bundle for the phase-compensated data and for summing the calculated at least one norm value, a second calculator for calculating at least one coherent norm value per bundle for the phase-compensated data and for summing the calculated at least one coherent norm value, and an SINR operator for simultaneously-operating the summation values of the first and second calculators to calculate an SINR.

According to another aspect of the present invention, a method for reception in a wireless communication system is provided. The method includes processing a received signal by Orthogonal Frequency Division Multiplexing (OFDM) demodulation to convert the received signal into frequency-domain data, selecting ranging data from the frequency-domain data, multiplying the selected ranging data by a ranging code to perform code demodulation, calculating at least one norm value and at least one coherent norm value by bundle for the code-demodulated data and estimating an SINR using the calculated at least one norm value and at least one coherent norm value.

According to an exemplary implementation, the estimating of the SINR may include detecting a timing offset using the code-demodulated data, phase-compensating the code-demodulated data using the timing offset, calculating at least one norm value per bundle for the phased-compensated data and obtaining a first summation value by summing the calculated at least one norm value, calculating at least one coherent value per bundle for the phased-compensated data and obtaining a second summation value by summing the calculated at least one coherent norm value, and calculating an SINR by simultaneously-operating the first summation value and second summation value.

Other aspects, advantages, and salient features of the invention will become apparent to those skilled in the art form the following detailed description, which, taken in conjunction with the annexed drawings, discloses exemplary embodiments of the invention.

BRIEF DESCRIPTION OF THE DRAWINGS

The above and other aspects, features and advantages of the certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, well-known functions and constructions are omitted for clarity and conciseness. Furthermore, the terms used herein are defined according to the functions of the present invention. Thus, the term may vary depending on user's or operator's intentions. Therefore, the terms used herein must be understood based on descriptions made herein.

A technology for estimating a Signal to Interference and Noise Ratio (SINR) of a ranging signal in a broadband wireless communication system according to an exemplary embodiment of the present invention is described below. Ranging can be classified into initial ranging, periodic ranging, bandwidth request ranging, handover ranging and the like. A description of initial ranging is made below, for purposes of example only. That is, the present invention is applicable to all ranging purposes, not merely that of initial ranging.

The following description is made in the context of an Orthogonal Frequency Division Multiplexing (OFDM) broadband wireless access communication system. However, it is to be understood that this is merely for the sake of convenience and that the present invention is not limited to an OFDM-based system. Thus, it should be clearly understood that the present invention is also applicable to any other communication system requiring SINR estimation.

Figure 1:
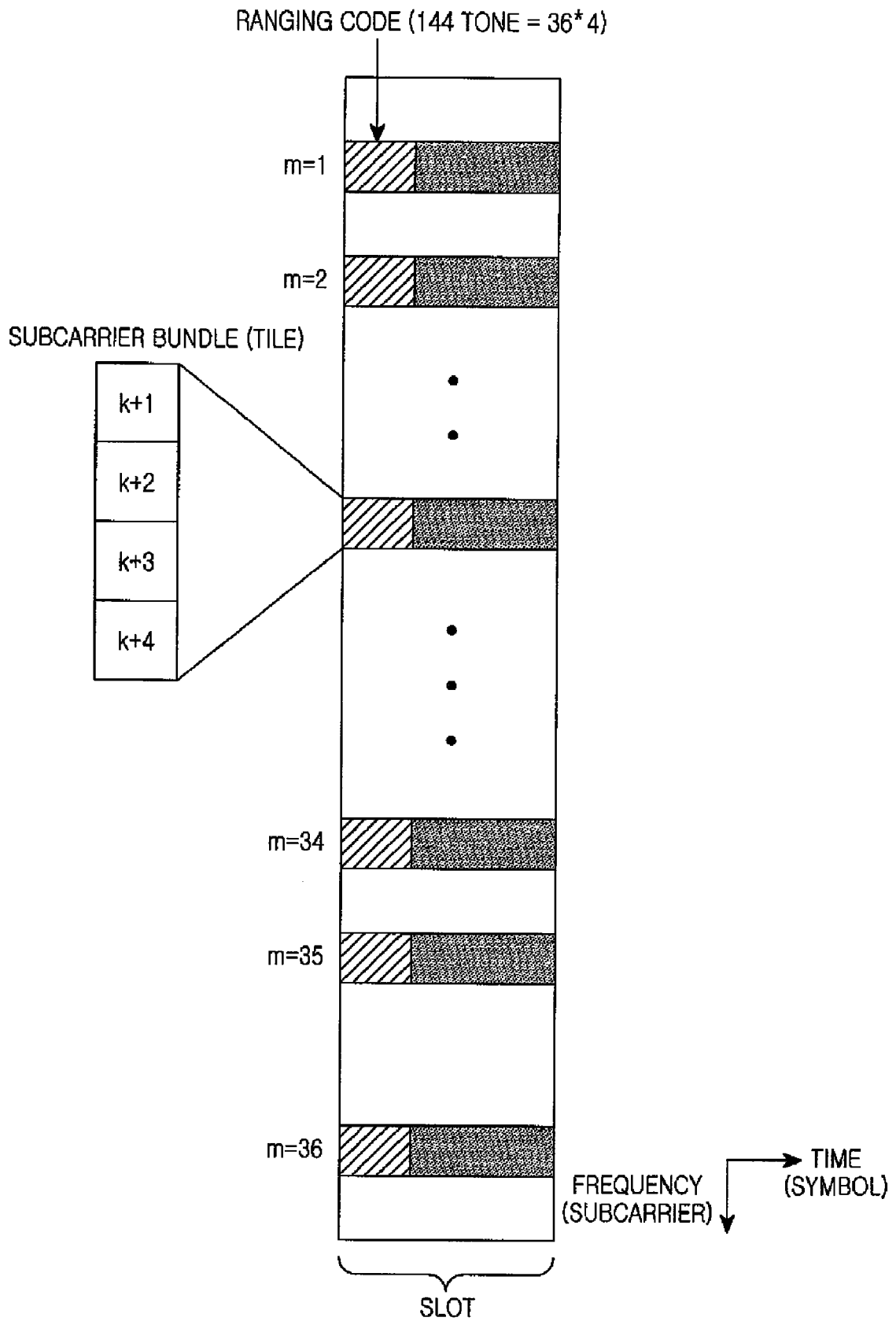
FIG. 1 is a diagram illustrating a structure of a ranging channel according to an exemplary embodiment of the present invention.

FIG. 1 is a diagram illustrating a structure of a ranging channel according to an exemplary embodiment of the present invention. For description convenience, an example of a ranging channel structure based on Institute of Electrical and Electronics Engineers (IEEE) 802.16 system is described. However, the ranging channel can be configured in various forms.

As shown in FIG. 1, a ranging channel includes 3 OFDM symbols (slots) in a time axis and 144 tones (or subcarriers) in a frequency axis. That is, a ranging code having a length of 144 bits is mapped to 36 bundles of 4 contiguous subcarriers (i.e., 144 tones) on a frequency axis. For example, a subcarrier bundle can be a 4×3 tile of a Partial Usage of SubCarrier (PUSC) permutation scheme regulated in an IEEE 802.16 system. Twelve subcarriers constituting one tile are physically contiguous to each other, but the tiles are permutated and separated from each other on a frequency axis to prevent a ranging channel from succumbing to deep fading.

Transmission schemes of a ranging code differ from each other depending on the kind of ranging. In the case of initial ranging, one ranging code is repeatedly transmitted during two OFDM symbol intervals. In the case of periodic ranging and bandwidth request ranging, one ranging code can be transmitted during one OFDM symbol interval or three ranging codes can be transmitted during three OFDM symbol intervals.

Figure 2:
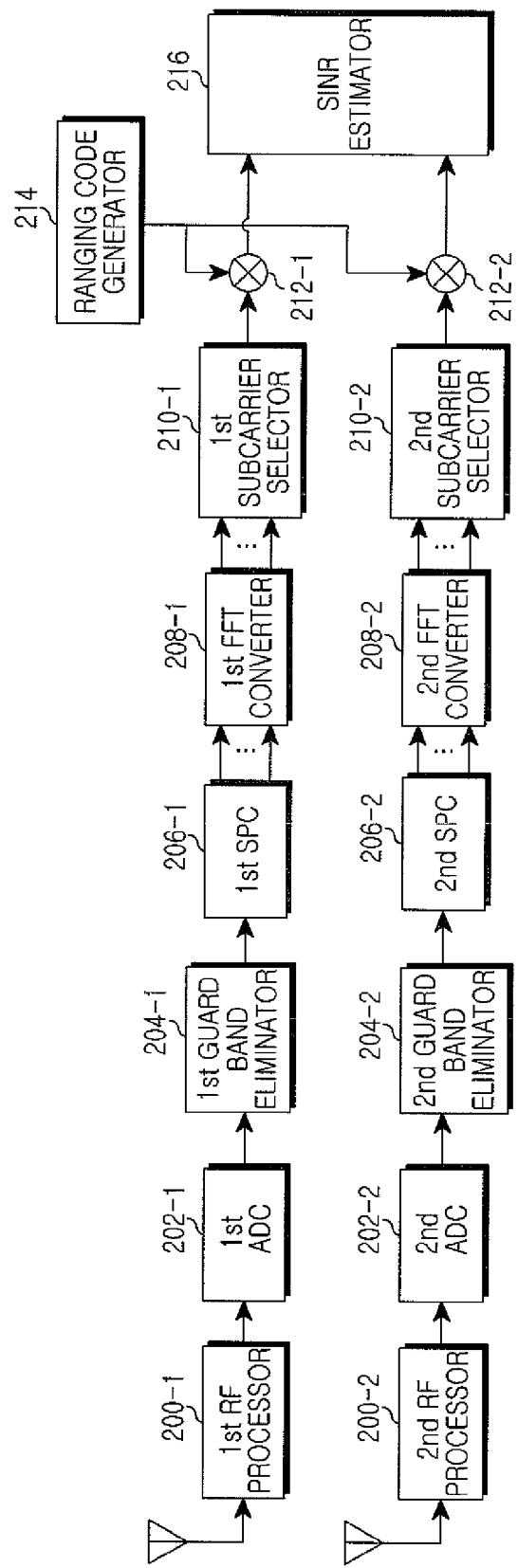
FIG. 2 is a block diagram illustrating a construction of a receiver in a broadband wireless communication system according to an exemplary embodiment of the present invention.

FIG. 2 is a block diagram illustrating a construction of a receiver in a broadband wireless communication system according to an exemplary embodiment of the present invention. In the illustrated exemplary embodiment, the broadband wireless communication system uses a Multiple Input Multiple Output (MIMO) antenna system. Also, the number of receive antennas of a Base Station (BS) in the MIMO system is assumed to be equal to '2'. Of course, the use of the MIMO system and the number of receive antennas at the BS is merely for sake of description convenience and is not intended to be limiting.

As shown in FIG. 2, a receiver (e.g. a BS) includes a plurality of Radio Frequency (RF) processors 200-1 and 200-2, a plurality of Analog to Digital Converters (ADCs) 202-1 and 202-2, a plurality of guard band eliminators 204-1 and 204-2, a plurality of Serial to Parallel Converters (SPCs) 206-1 and 206-2, a plurality of Fast Fourier Transform (FFT) operators 208-1 and 208-2, a plurality of subcarrier selectors 210-1 and 210-2, a plurality of multipliers 212-1 and 212-2, a ranging code generator 214, and a Signal to Interference and Noise Ratio (SINR) estimator 216.

Referring to FIG. 2, the plurality of RF processors 200-1 and 200-2 each include a filter, a frequency converter and the like, and convert an RF band signal received through a corresponding antenna into a baseband signal. The plurality of ADCs 202-1 and 202-2 each convert an analog baseband signal output from the corresponding RF processor 200-1 or 200-2 into a digital signal (i.e., sample data). The plurality of guard band eliminators 204-1 and 204-2 each remove a guard band (i.e., a Cyclic Prefix (CP)) from sample data output from the corresponding ADC 202-1 or 202-2.

The plurality of SPCs 206-1 and 206-2 each convert sample data output from the corresponding guard band eliminator 204-1 or 204-2 into parallel data. The plurality of FFT operators 208-1 and 208-2 each process, by FFT operation, data output from the corresponding SPC 206-1 or 206-2 and output subcarrier values (i.e., frequency-domain data).

The plurality of subcarrier selectors 210-1 and 210-2 each select ranging data (e.g., a sequence of 144 bits) from among the frequency-domain data output by the corresponding FFT operator 208-1 or 208-2. The ranging code generator 214 generates and provides ranging codes within a ranging code set to the plurality of multipliers 212-1 and 212-2 in regular sequence. Each of the plurality of multipliers 212-1 and 212-2 multiplies the ranging data from the corresponding subcarrier selector 210-1 or 210-2 by the ranging code supplied from the ranging code generator 214 to perform code demodulation. That is, the plurality of multipliers 212-1 and 212-2 correlate the ranging data with each of the ranging codes and generate as much correlation data as a number of codes.

The SINR estimator 216 estimates an SINR on a per-antenna basis by phase-compensating the code-demodulated data, obtaining a norm value by bundle (e.g., tile) for the phase-compensated data and summing the obtained norm values to provide a first summation value, obtaining a coherent norm value by bundle and summing the obtained coherent norm values to provide a second summation value, and processing the first summation value and second summation value by simultaneous operation. Then, the SINR estimator 216 obtains a final SINR value by combining the SINR value estimated by antenna and converts the final SINR value into a decibel (dB) value. The final SINR value can be used for resource scheduling or power control. A construction and operation of an SINR estimator are described below with reference to the accompanying drawings.

Figure 3:
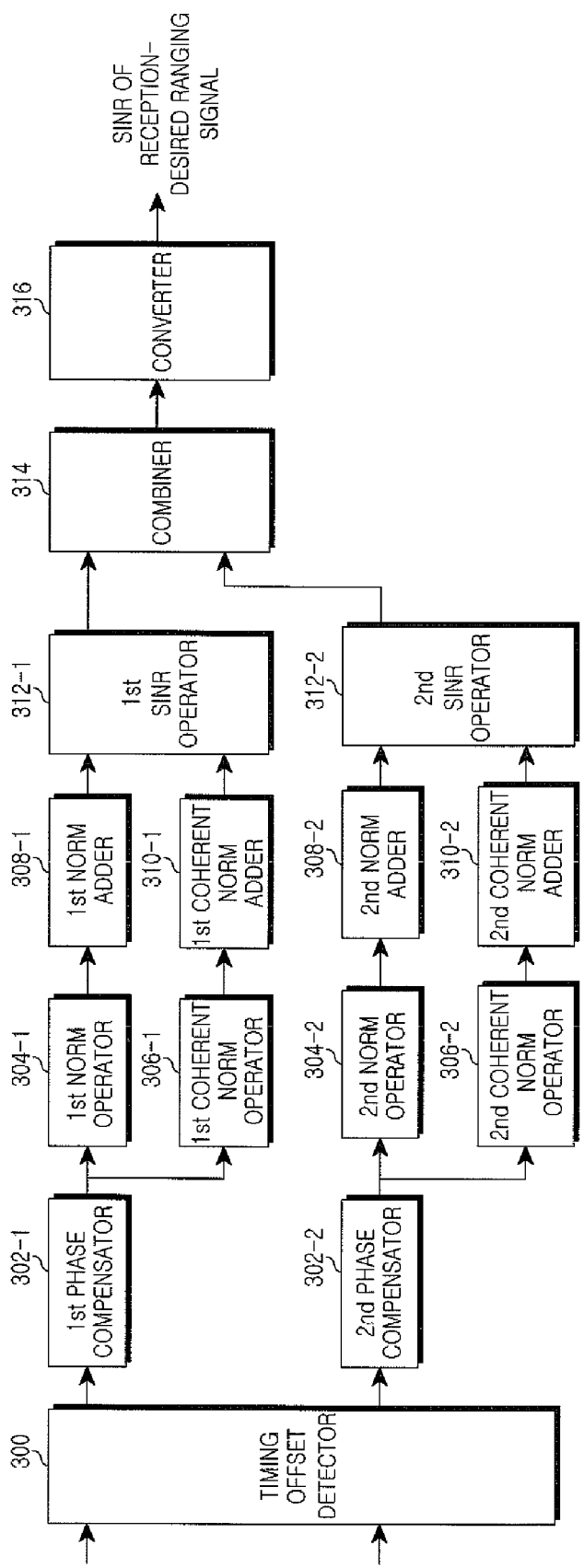
FIG. 3 is a detailed block diagram illustrating a construction of a Signal to Interference and Noise Ratio (SINR) estimator according to an exemplary embodiment of the present invention.

FIG. 3 is a detailed block diagram illustrating a construction of an SINR estimator according to an exemplary embodiment of the present invention.

As shown in FIG. 3, an SINR estimator includes a timing offset detector 300, a plurality of phase compensators 302-1 and 302-2, a plurality of norm operators 304-1 and 304-2, a plurality of coherent norm operators 306-1 and 306-2, a plurality of norm adders 308-1 and 308-2, a plurality of coherent norm adders 310-1 and 310-2, a plurality of SINR operators 312-1 and 312-2, a combiner 314, and a converter 316.

Referring to FIG. 3, the timing offset detector 300 evaluates correlation data (i.e., code-demodulated data) received from a plurality of multipliers (e.g. 212-1 and 212-2), detects peak-detected ranging signals, and selects a ranging signal requiring SINR estimation among the detected ranging signals. The selected ranging signal is defined as a "desired signal". An SINR estimation method for the desired signal is described below.

The timing offset detector 300 detects a timing offset for each desired signal received through two antennas and provides correlation data (i.e., code-demodulated data) together with the corresponding timing offset to the corresponding phase compensator 302-1 or 302-2. Because a method for detecting a timing offset of a received ranging signal is known in the art, its description is omitted. The timing offset of the desired signal represents a difference between a start position (i.e. sample position) of a received signal and an absolute timing of a Base Station (BS) based on Global Positioning System (GPS). The timing offset is an offset value for sample synchronization between an MS and the BS.

The plurality of phase compensators 302-1 and 302-2 each receive code-demodulated data of a corresponding antenna and a timing offset from the timing offset detector 300 and compensate the code-demodulated data for its distorted phase using the timing offset. A phase compensation operation of each of the phase compensators 302-1 and 302-2 is expressed by Equation 1.

$$Z_{m,k} = Y_{m,k} \times \exp(-jk\Delta\theta) \quad (1)$$

In Equation 1, the variable '$Y_{m,k}$' represents code-demodulated data, the variable 'm' represents a bundle (e.g., tile) index, and the variable 'k' represents a subcarrier index within a bundle. The variable $\Delta\theta$ is given as $\Delta\theta = 2\pi \cdot T_{offset} / N_{FFT}$. Here, the variable $N_{FFT}$ represents an FFT size, and the variable $T_{offset}$ represents a timing offset value. That is, the phase compensation is performed by multiplying the code-demodulated data ($Y_{m,k}$) by $\exp(-jk\Delta\theta)$.

The plurality of norm operators 304-1 and 304-2 each calculate a norm value by subcarrier for phase-compensated data output from the corresponding phase compensator 302-1 or 302-2 and sum the calculated norm values by bundle. Here, the norm operation represents a square of magnitude. An operation process of each of the norm operators 304-1 and 304-2 is expressed by Equation 2 below.

$$P_{sub,m} = \frac{1}{4} \sum_{k=1}^{4} |Z_{m,k}|^2 \quad (2)$$

In Equation 2, the variable 'm' represents a bundle (e.g., tile) index and the variable 'k' represents a subcarrier index within a bundle. Also, a number of subcarriers within the bundle is assumed to be equal to '4'. In order to normalize a signal power increase due to a processing gain, a summation value by bundle is divided by '4'.

The plurality of coherent norm operators 306-1 and 306-2 each sum subcarrier values by bundle for phase-compensated data output from the corresponding phase compensators 302-1 and 302-2 and calculate a norm of the summation value. An operation process of each of the coherent norm operators 306-1 and 306-2 is expressed by Equation 3 below.

$$P_{tile,m} = \frac{1}{16} \left| \sum_{k=1}^{4} Z_{m,k} \right|^2 \quad (3)$$

In Equation 3, the variable 'm' represents a bundle (e.g., tile) index and the variable 'k' represents a subcarrier index within a bundle. Also, a number of subcarriers within the bundle is assumed to be equal to '4'. In order to normalize a signal power increase due to a processing gain, a summation value by bundle is divided by '16'.

The plurality of norm adders 308-1 and 308-2 each sum a plurality of norm values output from the corresponding norm operators 304-1 and 304-2. When assuming a ranging code having a length of 144 bits and there are 4 subcarriers by bundle, the norm adders 308-1 and 308-2 sum a total of 36 norm values. An operation process of the norm adder 308-1 or 308-2 is expressed as in Equation 4 below.

$$P_{sub} = \frac{1}{4} \sum_{m=1}^{36} \sum_{k=1}^{4} |Z_{m,k}|^2 \quad (4)$$

$$\approx \sum_{m=1}^{36} |H_m|^2 + \sum_{m=1}^{36} |U_m|^2$$

$$= 36|H|^2 + 36|U|^2$$

In Equation 4, the variable 'm' represents a bundle (e.g., tile) index and the variable 'k' represents a subcarrier index within a bundle. Also, the variable $|H_m|^2$ represents a signal power passing through a channel response for an $m^{th}$ bundle, the variable $|U_m|^2$ represents a mean interference noise power for an $m^{th}$ bundle, the variable $|H|^2$ represents a mean signal power for the whole bundle, and the variable $|U|^2$ represents a mean interference noise power for the whole bundle. That is, an output value of the norm adder 308-1 or 308-2 can be approximated to $36|H|^2+36|U|^2$.

The plurality of coherent norm adders 310-1 and 310-2 each sum a plurality of norm values output from the corresponding coherent norm operators 306-1 and 306-2. An operation process of the coherent norm adder 310-1 or 310-2 is expressed as in Equation 5 below.

$$P_{tile} = \frac{1}{16} \sum_{m=1}^{36} \left| \sum_{k=1}^{4} Z_{m,k} \right|^2 \quad (5)$$

$$\approx \sum_{m=1}^{36} |H_m|^2 + \frac{1}{4} \sum_{m=1}^{36} |U_m|^2$$

$$= 36|H|^2 + 9|U|^2$$

In Equation 5, the variable 'm' represents a bundle (e.g., tile) index and the variable 'k' represents a subcarrier index within a bundle. Also, the variable $|H_m|^2$ represents a signal power passing through a channel response for an $m^{th}$ bundle, the variable $|U_m|^2$ represents a mean interference noise power for an $m^{th}$ bundle, the variable $|H|^2$ represents a mean signal power for the whole bundle, and the variable $|U|^2$ represents a mean interference noise power for the whole bundle. That is, an output value of the coherent norm adder 310-1 or 310-2 can be approximated to $36|H|^2+9|U|^2$.

As appreciated from Equations 4 and 5, the output values of the norm adder 308-1 or 308-2 and the coherent norm adder 310-1 or 310-2 are different from each other in a signal to noise power ratio.

The plurality of SINR operators 312-1 and 312-2 each process, by simultaneous operation, values from the corresponding norm adder 308-1 or 308-2 and coherent norm adder 310-1 or 310-2 and estimate an SINR of a desired ranging signal. An operation process of the SINR operator 312-1 or 312-2 is expressed as in Equation 6 below.

$$SINR = \frac{|H|^2}{|U|^2} = \frac{P_{tile} - P_{sub}/4}{P_{sub} - P_{tile}} \quad (6)$$

As such, an exemplary embodiment of the present invention averages norm values by bundle, thereby being capable of reducing the bias influence caused by a cross-correlation between ranging codewords that are different from each other.

The combiner 314 combines SINR values measured by antenna from the plurality of SINR operators 312-1 and 312-2. For example, the combiner 314 can total a plurality of SINR values and, alternatively, can select and output the largest one of a plurality of SINR values.

The converter 316 converts an SINR value output from the combiner 314 into a dB scale and outputs the converted dB value. The SINR value (dB) can be used for resource scheduling or power control.

Figure 4:
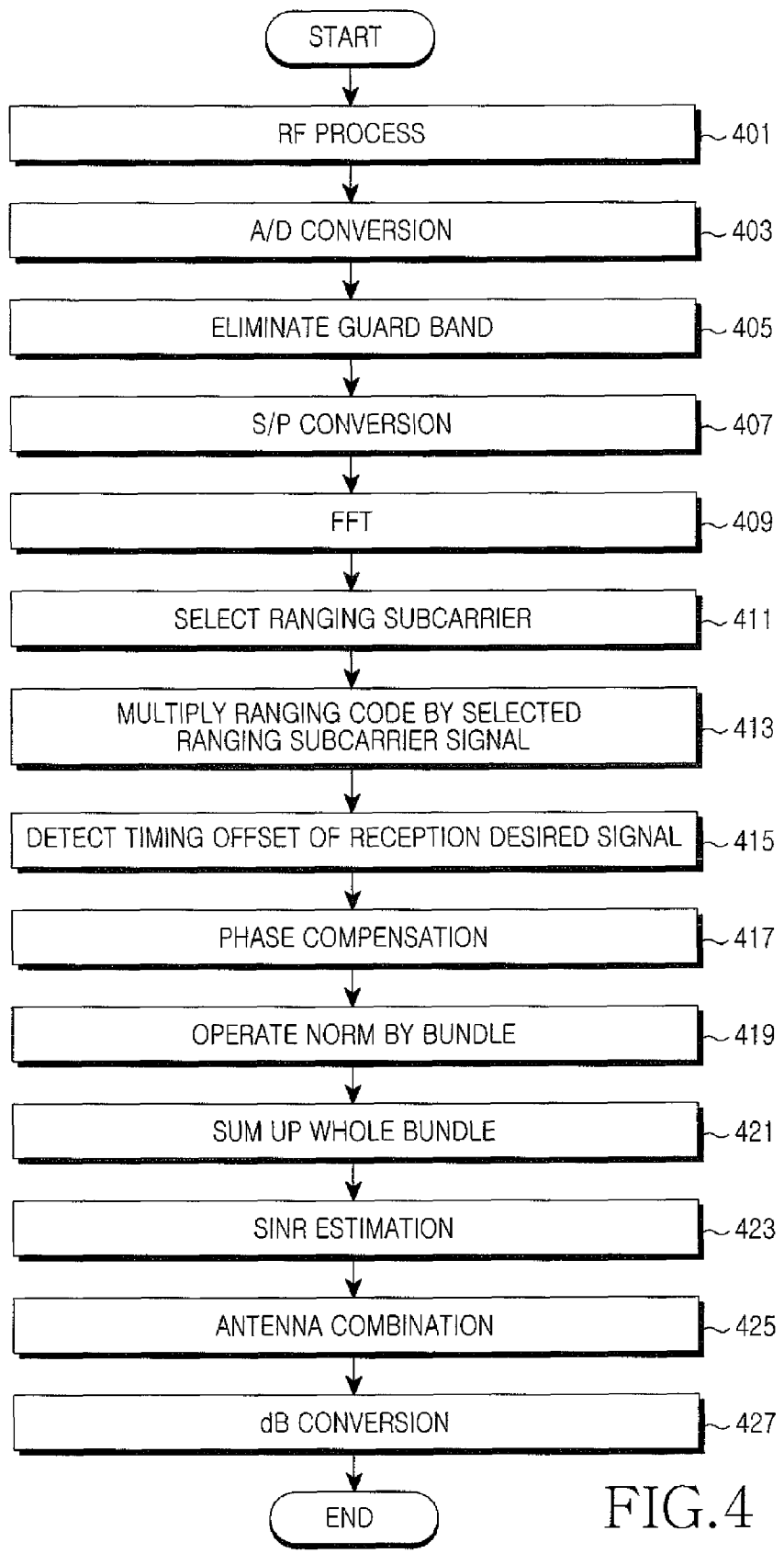
FIG. 4 is a flow diagram illustrating an operation process of a receiver in a wireless communication system according to an exemplary embodiment of the present invention.

FIG. 4 is a flow diagram illustrating an operation process of a receiver in a wireless communication system according to an exemplary embodiment of the present invention. Here, the assumption is that the receiver (i.e., a BS) includes two receive antennas.

Referring to FIG. 4, in step 401, a receiver converts each RF signal received through a plurality of antennas into a baseband signal. In step 403, the receiver converts each of a plurality of baseband signals into baseband sample data. In step 405, the receiver removes a guard band (e.g., a CP) from each of a plurality of sample data.

In step 407, the receiver converts each of the plurality of sample data from which the guard bands are eliminated into parallel data. In step 409, the receiver processes each of a plurality of parallel data by FFT operation and converts each of the plurality of parallel data into frequency-domain data. Then, in step 411, the receiver selects ranging data (e.g., a sequence of 144 bits) from each of a plurality of frequency-domain data.

In step 413, the receiver multiplies each of the selected plurality of ranging data by ranging codes within a code set in regular sequence to perform code demodulation. Then, in step 415, the receiver evaluates code-demodulated data, selects a ranging signal (i.e., a desired signal) to estimate an SINR, and detects a timing offset for each desired signal received through the plurality of antennas. Here, a method for detecting a timing offset using a ranging signal is known in the art and thus, its detailed description is omitted. In step 417, the receiver phase-compensates code-demodulated data of each antenna corresponding to the desired signal, using the timing offset.

Then, in step 419, the receiver calculates a norm by subcarrier for each phase-compensated data and sums the calculated norm values by bundle (e.g., tile). The thus calculated value is defined as a "norm value per tile". For example, the norm value by tile can be obtained using Equation 2. Then, in step 419, the receiver sums up subcarrier values by bundle for each phase-compensated data and calculates a norm of the summation value. The thus calculated value is defined as a "coherent norm value per tile". For example, the coherent norm value by tile can be obtained using Equation 3.

Then, in step 421, the receiver sums all the norm values by tile to provide a first summation value and sums all the coherent norm values by tile to provide a second summation value. In step 423, the receiver processes, by simultaneous operation, the first summation value and second summation value, to estimate an SINR. For example, the simultaneous operation can be performed using Equation 6.

After estimating an SINR for each antenna as above, in step 425, the receiver combines the plurality of estimated SINR values. For example, the receiver can sum up all the plurality of SINR values and, alternatively, can select the largest one of a plurality of SINR values. Then, in step 427, the receiver converts the combined SINR value into a dB value. As such, the calculated SINR value (dB) can be used for resource scheduling or power control.

In the aforementioned exemplary embodiments of the present invention, a receiver is assumed to include a multiple receive antenna, but, even when having one receive antenna, the receiver can estimate an SINR identically. In this case, one SINR is estimated, thus not requiring an antenna combination (or an SINR combination).

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A receiver in a wireless communication system, the receiver comprising:
    a demodulator for processing a received signal by Orthogonal Frequency Division Multiplexing (OFDM) demodulation to convert the received signal into frequency-domain data;
    a selector for selecting bundled ranging data from the frequency-domain data;
    a multiplier for multiplying the selected bundled ranging data by a ranging code to perform code demodulation; and
    a Signal to Interference and Noise Ratio (SINR) estimator for calculating at least one norm value and at least one coherent norm value by bundle for the code-demodulated data, and for estimating an SINR using the calculated at least one norm value and at least one coherent norm value.

2. The receiver of claim 1, wherein the SINR estimator comprises:
    a detector for detecting a timing offset using the code-demodulated data; and
    a phase compensator for phase-compensating the code-demodulated data using the timing offset.

3. The receiver of claim 2, wherein the SINR estimator comprises:
    a first calculator for calculating the at least one norm value per bundle for the phase-compensated data and for summing the calculated at least one norm value;
    a second calculator for calculating the at least one coherent norm value per bundle for the phase-compensated data and for summing the calculated at least one coherent norm value; and
    an SINR operator for simultaneously-operating the summation values of the first and second calculators to calculate an SINR.

4. The receiver of claim 3, wherein the first calculator comprises:
    a norm operator for calculating at least one norm value by subcarrier for the phase-compensated data and summing the calculated at least one norm value by bundle; and
    an adder for adding the summation values by bundle from the norm operator.

5. The receiver of claim 4, wherein the norm operator performs operation using the Equation:

$$P_{sub,m} = \frac{1}{4}\sum_{k=1}^{4}|Z_{m,k}|^2$$

where 'm' represents a bundle index, 'k' represents a subcarrier index within a bundle, and the number of subcarriers within the bundle equals '4'.

6. The receiver of claim 3, wherein the second calculator comprises:
    a coherent norm operator for summing subcarrier values by bundle for the phase-compensated data and for calculating a norm of the summation value; and
    an adder for adding the norm values by bundle from the coherent norm operator.

7. The receiver of claim 6, wherein the coherent norm operator performs an operation using the Equation:

$$P_{tile,m} = \frac{1}{16}\left|\sum_{k=1}^{4}Z_{m,k}\right|^2$$

where 'm' represents a bundle index, 'k' represents a subcarrier index within a bundle, and a number of subcarriers within the bundle equals '4'.

8. The receiver of claim 3, wherein, when an output value of the first calculator is equal to $P_{sub}$ and an output value of the second calculator is equal to $P_{tile}$, the SINR calculator performs an operation using the Equation:

$$SINR = \frac{|H|^2}{|U|^2} = \frac{P_{tile} - P_{sub}/4}{P_{sub} - P_{tile}}$$

where $|H|^2$ represents a mean signal power for the whole bundle and $|U|^2$ represents a mean interference noise power for the whole bundle.

9. The receiver of claim 1, wherein the subcarrier bundle comprises a tile.

10. The receiver of claim 1, further comprising:
    a multiple receive antenna; and
    a combiner for combining SINRs estimated by antenna.

11. The receiver of claim 1, wherein the demodulator comprises:
    a Radio Frequency (RF) processor for converting an RF signal received through an antenna into a baseband signal;
    an Analog to Digital Converter (ADC) for converting a baseband signal from the RF processor into baseband sample data; and
    an Orthogonal Frequency Division Multiplexing (OFDM) demodulator for eliminating a guard band from the sample data provided from the ADC, for performing an FFT operation, and for generating the frequency-domain data.

12. The receiver of claim 1, wherein the demodulator comprises:
    a code generator for generating ranging codes within a ranging code set in regular sequence; and
    a multiplier for multiplying the selected ranging data by each of the ranging codes from the code generator to perform code demodulation.

13. The receiver of claim 1, further comprising a controller for performing at least one of scheduling and power control using the estimated SINR.

14. A receiving method in a wireless communication system, the method comprising:
processing a received signal by Orthogonal Frequency Division Multiplexing (OFDM) demodulation to convert the received signal into frequency-domain data;
selecting bundled ranging data from the frequency-domain data;
multiplying the selected bundled ranging data by a ranging code to perform code demodulation;
calculating at least one norm value and at least one coherent norm value by bundle for the code-demodulated data; and
estimating an SINR using the calculated at least one norm value and at least one coherent norm value.

15. The method of claim 14, wherein the estimating of the SINR comprises:
detecting a timing offset using the code-demodulated data; and
phase-compensating the code-demodulated data using the timing offset.

16. The method of claim 15, wherein the estimating of the SINR comprises:
calculating the at least one norm value per bundle for the phase-compensated data and obtaining a first summation value by summing the calculated at least one norm value;
calculating the at least one coherent norm value per bundle for the phase-compensated data and obtaining a second summation value by summing the calculated at least one coherent norm value; and
calculating an SINR by simultaneously-operating the first summation value and second summation value.

17. The method of claim 16, wherein the calculating of the first summation value comprises:
calculating at least one norm value by subcarrier for the phase-compensated data and summing the calculated at least one norm value by bundle; and
adding the summation values to calculate the first summation value.

18. The method of claim 17, wherein the summation value by bundle ($P_{sub,m}$) is calculated using Equation:

$$P_{sub,m} = \frac{1}{4}\sum_{k=1}^{4}|Z_{m,k}|^2$$

where 'm' represents a bundle index, 'k' represents a subcarrier index within a bundle, and number of subcarriers within the bundle equals '4'.

19. The method of claim 16, wherein the calculating of the second summation value comprises:
summing subcarrier values by bundle for the phase-compensated data and calculating a norm of the summation value; and
adding the norm values to calculate the second summation value.

20. The method of claim 19, wherein the norm value by bundle ($P_{tile,m}$) is calculated using the Equation:

$$P_{tile,m} = \frac{1}{16}\left|\sum_{k=1}^{4}Z_{m,k}\right|^2$$

where 'm' represents a bundle index, 'k' represents a subcarrier index within a bundle, and the number of subcarriers within the bundle equals '4'.

21. The method of claim 16, wherein, when the first summation value is given as $P_{sub}$ and the second summation value is given as $P_{tile}$, the SINR is calculated using the Equation:

$$SINR = \frac{|H|^2}{|U|^2} = \frac{P_{tile} - P_{sub}/4}{P_{sub} - P_{tile}}$$

where $|H|^2$ represents a mean signal power for the whole bundle and $|U|^2$ represents a mean interference noise power for the whole bundle.

22. The method of claim 14, wherein the subcarrier bundle comprises a tile.

23. The method of claim 14, further comprising, when there is a multiple receive antenna, combining SINRs estimated by antenna.

24. The method of claim 14, further comprising performing at least one of scheduling and power control using the estimated SINR.

25. A receiver in a wireless communication system, the receiver comprising:
a demodulator for demodulating a received signal and converting the received signal into frequency-domain data;
a selector for selecting bundled ranging data from the frequency-domain data;
a multiplier for multiplying the selected bundled ranging data by a ranging code to perform code demodulation; and
a Signal to Interference and Noise Ratio (SINR) estimator for calculating at least one norm value and at least one coherent norm value by bundle for the code-demodulated data, and for estimating an SINR using the calculated at least one norm value and at least one coherent norm value.

* * * * *